Patented Jan. 8, 1952

2,581,635

UNITED STATES PATENT OFFICE 2,581,635

WOOD FIBER BASE MATERIAL AND PROCESS FOR MAKING THE SAME

Edwin P. Cox, Hamilton, Ohio, assignor to The Champion Paper and Fibre Company, Hamilton, Ohio, a corporation of Ohio No Drawing. Application May 27, 1944,
Serial No. 537,733

3 Claims. (Cl. 154—133)

1

This invention relates to wood or wood fiber base materials, particularly composite products and products such as are plastic-impregnated or are used as a base for impregnation.

It has in the past been customary to build up composite wood products by assembling the parts using various types of glue as the adhesive and holding the parts under relatively light pressures during the setting of the glue. In recent years the older glues have been replaced by water-resistant glues and synthetic resins while products of greater density and strength have been obtained by using synthetic resins both as impregnants and as glues in the manufacture of laminated products such as plywood and the like. Products of still greater strength and density have more recently been produced by applying heavy pressures along with the heat required to cure the resinous impregnants. Specially prepared paper sheets have also been used instead of wood as bases for impregnation and lamination. The strength characteristics of the resulting products, however, though they may have been better in some respects, were inferior in other respects to those of the compressed impregnated wood.

The primary object of the present invention is to produce, from any given wood, impregnated and laminated materials having strength and other properties materially superior to those of products made from the same wood by previously known processes by use of similar proportions of impregnant. An allied object is the provision of a wood fiber base for impregnation from which such superior impregnated and laminated materials may conveniently be formed. Another object of the invention is the provision of methods for producing such products. Other objects and advantages of the invention will become apparent from the following description.

2

I have now discovered that these objects can be accomplished by subjecting the parts or laminae, prior to impregnation and assembly, to a suitable chemical treatment. This treatment may be similar to any of the known chemical wood pulping processes in that it may advantageously employ the same or analogous chemical reactions, but should differ therefrom in certain major respects, relating to the physical aspects of the process. First, the usual "blowing" of the digester should be omitted and instead the pressure therein should be gradually reduced to approximately atmospheric pressure, advantageously by cooling, prior to opening the digester and removing the cooked wood therefrom. Second, during both the cooking and the washing operations, the pieces of wood being treated are preferably individually supported on foraminous carriers such as wire screens. The screens used should be of sufficiently open mesh to permit free circulation of the cooking and washing liquors to all parts of the wood. They should, however, be of sufficiently close weave, with reference to the size and thickness of the wood, to furnish support sufficient to maintain the fiber arrangement of the original wood substantially intact during and after the removal of the natural cementing material by the cooking and washing operations. The cooking should be accomplished without agitation which might tend to disturb the fiber arrangement, and the washing, for the same reason, is advantageously carried out by submerging the material for a considerable time in running water of low velocity.

When, as is usually the case, it is desired that the cooking action should extend throughout the thickness of the wood, sections of suitable thinness should be used, such as may be obtained by any of the usual processes of cutting veneer, The term "thin" is used herein to define a thickness which is not too great to permit cooking of the wood throughout. It may in general be understood to mean not much over, and in general considerably less than, one-half inch.

As is well understood in the chemical wood pulping art, the type of cook should be adapted to the type of wood being cooked and the results desired. When fiber strength is the objective, the chemical treatment used may advantageously be an adaptation of the sulfate or kraft process or of the so-called Mitscherlich variant of the sulfite process.

After washing, the material is advantageously dried on the same or similar foraminous carriers to a moisture content in the neighborhood of five per cent. The drying may, if desired, be expedited by pressing the wet material against absorbent felt or the like as is done in paper making practice. Alternatively the undried or partially dried material may be impregnated directly with water or alcohol-soluble impregnants.

The impregnation is accomplished in the known manner and the impregnated material is then advantageously dried to a volatile content in the neighborhood of five per cent. Ordinarily the sheets, unless of excessive size or thinness, may thereafter be handled safely without support.

The parts are then assembled in accordance with any of the known procedures for making composite or laminated structures. The impregnant itself, if adequate in amount, may serve as the adhesive to hold the plies together, otherwise additional adhesive, advantageously the same as the impregnant, may be added. When synthetic thermosetting resins are used as impregnants, they are cured under heat and pressure in the usual manner. The pressure used with any impregnant may be merely that required to cause adhesion between the parts, or it may be increased by any amount up to that which will close all voids and render the material substantially solid.

Products resulting from the process as described are found to markedly excel previously obtainable wood base products in a number of important properties, such as strength per unit of weight, strength per unit of cross sectional area, impact resistance, resistance to damage by water, etc. These products are also unique in composition, containing normally from 60 to 75 per cent, and in special cases still higher proportions up to the neighborhood of 85 or 90 per cent, of cellulose fiber, depending on the properties desired in the product. If highly compressed, they may occupy as little as 25 to 20 per cent or less of the volume of the original wood, contain as much as 0.80 to 1.00 or more grams of cellulose fiber per cubic centimeter, and have ultimate tensile strengths of over 60,000 pounds per square inch. When compressed to this degree, the delignified impregnated wood occupies a volume less than that to which it is possible to compress the original wood. This is apparent from the well known facts that cellulose fibers (alpha cellulose) constitute from less than 40 up to about 50 per cent of the dry weight of wood, and that the dry weight of solid wood substance (nearly constant for all species) is between 1.46 and 1.56 grams per cubic centimeter. Accordingly, the maximum possible fiber content obtainable by any degree of compression of natural wood is 50 per cent of 1.56 or 0.78 grams per cubic centimeter.

The following example of the process as actually carried out and of tests on the resulting product will serve to illustrate the present invention. An airplane grade of sliced-cut, one-sixteenth inch, Sitka spruce veneer was supported on one-eighth inch mesh wire screens which were in turn individually supported in a rack which was moved bodily into a special sulfate digester where it was given a mild sulfate cook. The aqueous cooking liquor used contained 7.02 grams $Na_2S$ and 46.6 grams NaOH per liter. The temperature in the digester was raised during a two-hour period to 346° F. and maintained at that temperature for one hour, then allowed to cool to atmospheric pressure before discharging the digester. The cooked veneer supported as described was washed by submergence in running water of low velocity for about 24 hours. The sheets were transferred from the screen supports to felt and were pressed between rolls in a manner similar to that in which newly formed paper webs are pressed in the manufacture of paper. After drying to about 8 per cent moisture content, the veneer could be handled without damage by the use of ordinary care. The oven dry weight of the veneer after cooking amounted to about 45 per cent of that before cooking.

After drying, the veneer was impregnated with a thermo-setting phenol-formaldehyde resin by immersion for a period of about 16 hours in an alchol solution containing about 33 grams of resin per liter. The impregnated veneer was then dried to a volatile content of from 5 to 6 per cent.

In one instance 37 sheets of this dried, delignified, and impregnated veneer were assembled with the grain directions parallel, the impregnant itself serving as a glue. The resin was then cured in a mold adapted to prevent lateral spreading, under a pressure of 1250 pounds per square inch at a temperature of 310° F. maintained for 15 minutes after this temperature had penetrated to the center of the mass as indicated by thermo-couples embedded therein. The material was then cooled under pressure to prevent possible damage by expansion of the volatile matter.

When removed from the press the finished material averaged about 0.46 inch in thickness, or slightly less than one-fifth of the thickness of the original wood. (It should be noted that this takes no account of any lateral shrinkage which may have occurred in the drying operations.) The approximate composition of the product on the dry basis was resin 27 per cent, cellulose fiber 73 per cent, while the volatile content was about 4 per cent.

For purposes of comparison a similar product was made from the same veneer, undelignified, impregnated with the same resin, compressed under the same pressure and cured for the same length of time at the same temperature. Twenty-two layers of this veneer were cemented together and after pressing and curing the resin, the finished material averaged about 0.49 inch in thickness, or about 35½ per cent of the thickness of the original wood. The approximate composition of this product was resin 28 per cent, cellulose fiber 33 per cent, non-cellulosic constituents of the wood 39 per cent, with a volatile content not determined.

The superiority of the product of the present invention over that of the prior art process will be apparent from a comparison of the properties of these two products as shown:

|  | Delignified | Undelignified | Improvement— |
|---|---|---|---|
|  |  |  | *Reduction* |
| Number of plies in panel | 37 | 22 |  |
| Thickness of panel inches | 0.46 | 0.49 |  |
| Specific gravity of panel | 1.35 | 1.26 |  |
| Water absorption [1]—24 hrs per cent | 2.3 | 6.1 | 62 |
| Swelling [1]—equilibrium do | 8.5 | 21.2 | 60 |
| Recovery [1] do | 0.4 | 3.9 | 90 |
| Static bending [1]: |  |  | *Increase, per cent* |
| Modulus of rupture, 1000 p. s. i | 57.25 | 39.25 | 46 |
| Modulus of rupture/spec. gr | 42.4 | 31.2 | 36 |
| Modulus of elasticity, 1000 p. s. i | 5370 | 3525 | 52 |
| Modulus of elasticity/spec. gr | 3980 | 2800 | 42 |
| Compression parallel to grain [1]: |  |  |  |
| Ultimate strength, 1000 p. s. i | 31.93 | 20.66 | 54 |
| Ultimate strength/spec. gr | 23.7 | 16.4 | 44 |
| Modulus of elasticity, 1000 p. s. i | 6160 | 3770 | 63 |
| Modulus of elasticity/spec. gr | 4560 | 2990 | 53 |
| Compression edgewise across grain: |  |  |  |
| Ultimate strength, 1000 p. s. i | 14.8 | 7.7 | 93 |
| Ultimate strength/spec. gr | 11.0 | 6.1 | 80 |
| Modulus of elasticity, 1000 p. s. i | 789 | 589 | 34 |
| Modulus of elasticity/spec. gr | 584 | 467 | 25 |
| Izod Impact ft.-lb. per inch of notch: |  |  |  |
| Edgewise (average 2 samples) | 14.3 | 9.4 | 52 |
| Flatwise (1 sample) | 19.0 | 11.0 | 73 |

[1] These results average of 3 samples.

As is well known in the manufacture of chemical wood pulp, the severity of the cooking action can be varied by varying the factors involved, such as temperature, time, concentration of the chemicals used, etc. The more severe the cook the more complete will be the removal of the non-fibrous material and the more severe the attack on the fibers themselves, while the less severe the cook the less complete will be the removal of the non-cellulosic material and the greater the strength which will be retained by the fibers. The optimum conditions for strength in the present product appear to be secured when the cook is controlled to remove as much of the non-cellulosic material as can be removed without appreciably deteriorating the strength of the fibers. When this optimum condition has been approximated, substantially all of the non-cellulosic constituents have been removed and the fiber strength remains substantially intact.

Obviously the cook may be made more or less severe without sacrificing more than a minor portion of the advantages of the present invention. The preferred cooking processes lie within the range of commercial chemical pulping processes in the degree of removal of the non-cellulosic constituents of the wood, and the preferred product is one in which, before impregnation, the freedom from lignin, etc. is within the range acceptable in commercial chemical wood pulp. In this product the grain of the original wood and its fiber orientation and arrangement have been preserved substantially unchanged.

It is not essential to the practice of the invention that the wood be cut in thin sections and cooked throughout its entire thickness. It may be, in some cases, advantageous to cut the wood in thicker pieces of any size and shape appropriate to the purpose for which they are to be used, and cook these pieces to remove the non-cellulosic constituents from the part of the wood adjacent the surface while leaving the original composition of the wood undisturbed in the body of the piece. This method is of use, for example, in making parts where the requirements are for light weight and high resistance to bending stresses. For this purpose light wood of high fiber strength is cut to size and shape and is then cooked to delignify the parts adjacent the surface. It is thereafter impregnated and cured under pressure which results in the formation of a surface layer of high strength at the location where the stress concentration occurs in bending. This modification of the process is also of value for making articles which require an attractive and/or durable finish and which can be finished or refinished by a polishing operation without the application of finishes to the surface.

While the invention has been specifically described as involving the use of thermosetting phenol formaldehyde resins, the invention is not restricted to the use of any specific adhesive or binding agent, as the delignification of the wood while preserving the natural fiber arrangement and orientation serves to improve the properties of products made by the use of any adhesive. A variety of synthetic, usually thermosetting, resins are well known to be useful in the impregnation of wood for various purposes, and the present invention will result in a similar improvement regardless of the resin used. The term "wood-impregnating resins" as used in this specification and the appended claims, is to be understood to refer to resins which are thus known as suitable impregnants for wood.

While the high degree of compression hereinbefore set forth is useful in producing a product of a high strength per unit cross sectional area, it is not always necessary or desirable, since the substitution of a higher strength bonding agent for the natural bonding agents in the wood, in accordance with the present invention, without disturbing the fiber orientation and arrangement, results in a proportionate increase in strength even without compression, and is useful in cases where a high strength-weight ratio is more desirable than a high strength per unit of cross sectional area.

The invention is also independent of the size or shape of the individual pieces of wood which are treated in accordance with the process and of the manner or form in which they are assembled. They may be assembled solely with other delignified pieces, or with undelignified, surface delignified, or partially delignified pieces in accordance with the type of structure desired. They may be assembled into beams, sheets, or other structural units. They may be parallel or cross laminated at any angle desired. They may be formed into flat sheets or sheets of single or double curvature, or they may be assembled in accordance with any other of the known techniques, without departing from the spirit of the present invention.

The statements in the present specification and claims to the effect that the fiber arrangement or orientation is preserved substantially intact or is the same as in the original wood, are to be understood as applying to the individual plies or laminae and not in any sense as referring to the arrangement of the laminae. Neither do they imply the absence of such changes as occur in flattening rotary cut veneer or in bending or cutting any type of veneer to form structures of single or double curvature. Such statements further do not exclude the reduction of interfiber spacing or small changes in fiber direction which result from the densification of the product by cross grain compression as hereinbefore described. They are primarily intended to distinguish from fiber arrangements obtained by disintegrating the fiber structure of the wood and thereafter rearranging the fibers, as is done in the manufacture of paper. No matter how pronounced the grain of such a product, the fiber arrangement is totally different from that in the original wood and is specifically excluded from the meanings of these expressions.

The term "wood-base product" as herein used designates a product for which wood constituted the basic raw material and is not intended to be limited to products of which natural unmodified wood forms the basic part.

The term "wood fiber" is herein used in its accepted sense in the paper industry as synonomous with cellulose fiber, and, is to be understood as excluding non-cellulosic fibers.

By the use of the terms "non-fibrous" or "non-cellulosic" as defining certain constituents of wood, it is not intended to enter the highly technical and somewhat controversial subject of the exact composition of, or the specific location of the various constituents in, wood. The terms are used, rather, in the more popular sense as referring to those constituents which are generally more or less completely removed in the manufacture of chemical wood pulp. Lignin is frequently a major one of these constituents and the term "delignification" as herein used refers to removal of these constituents in general and does not necessarily imply a separation of the lignin from the other non-cellulosic constituents. It is further to be understood as referring to removal of all but insignificant proportions, as herein defined, of the lignin and other non-cellulosic constituents from the wood.

By "insignificant proportions" of lignin, etc. as used in the present specification and appended claims, is meant proportions acceptable in commercial chemical wood pulp, and by the term "substantially complete" as referring to the delignification, or removal of non-cellulosic constituents, is meant removal to the degree considered acceptable in the manufacture of commercial chemical wood pulp.

The term "plastic" is used in its popular and inclusive sense and is not limited to any specific product, synthetic resin or the like.

"Impregnation" as herein defined may be complete or incomplete and should be understood to mean any incorporation of material into the interfiber spaces and/or the bodies of the fibers themselves, whether in natural wood or in the delignified wood of the present invention.

The terms "chemical wood pulping process" and "sulfate wood pulping process" or the term "the chemical treatments involved in a chemical wood pulping process" as used in the present specification and the appended claims refer to the chemical aspects of the process and not the mechanical aspects of the process such as chipping the wood, agitating the digester charge, blowing the digester, etc. These terms are to be understood to include both the cooking and washing operations. Each of these operations forms a part of the process of removing non-cellulosic constituents from wood, and references herein made to such removal are to be understood as including both of these operations or their equivalents.

I claim:

1. Process of making a wood fiber base product, which comprises: substantially completely removing the non-cellulosic constituents from pieces of wood of small and substantially uniform thickness, by subjecting them to the chemical treatments involved in a chemical wood pulping process; preserving the form and integrity of said pieces, and the fiber orientation and arrangement therein, substantially without change during said removal; thereafter impregnating said wood with phenol-formaldehyde resin in amounts to form a product consisting of from sixty to ninety per cent, dry weight, of cellulose fiber with the balance substantially all resin; then curing the resin under heat and pressure; and throughout said removal, maintaining free access of the treating fluids to both sides of said thin pieces; said preservation of form, integrity, and fiber orientation and arrangement being accomplished by separately supporting each piece at close intervals throughout substantially the entire area of one of its major surfaces, and by protecting it from deforming stresses and disruptive influences.

2. Process as defined in claim 1, wherein a plurality of the impregnated pieces are superposed, and the heat and pressure for curing are applied after said superposition, and wherein the applied pressure compresses the superposed pieces to a volume smaller than that to which it would have been possible to compress the original wood, and wherein the pressure is maintained during the curing process.

3. A parallel laminated wood-fiber-base product composed of not less than eight-tenths gram per cubic centimeter of cellulose fiber, derived from wood, oriented and arranged as in the original wood, substantially free from the non-cellulosic constituents of wood, impregnated and held together by phenol-formaldehyde resin in an amount equal to between thirty-three and sixty-seven per cent, dry weight, of the cellulose fiber; the product having a modulus of rupture parallel to the grain of not less than fifty thousand pounds per square inch

EDWIN P. COX.

REFERENCES CITED

The following references are of record in the file of this patent:

UNITED STATES PATENTS

| Number | Name | Date |
|---|---|---|
| 646,547 | Sears | Apr. 3, 1900 |
| 1,052,851 | Skinner | Feb. 11, 1913 |
| 1,328,656 | Fish | Jan. 20, 1920 |

| Number | Name | Date |
|---|---|---|
| 1,390,355 | Gould | Sept. 13, 1921 |
| 1,415,683 | Nordyke | May 9, 1922 |
| 1,420,162 | Toles | June 20, 1922 |
| 1,427,682 | Graham | Aug. 29, 1922 |
| 1,465,937 | Forssman | Aug. 28, 1923 |
| 1,498,865 | Carpenter | June 24, 1924 |
| 1,503,549 | Munroe | Aug. 5, 1924 |
| 1,614,916 | Carpenter | Jan. 18, 1927 |
| 1,628,886 | Jackson et al. | May 17, 1927 |
| 1,834,895 | Brossman | Dec. 1, 1931 |
| 1,876,329 | Loetscher | Sept. 6, 1932 |
| 1,917,020 | Dent | July 4, 1933 |
| 1,933,573 | Wilmowsky | Nov. 7, 1933 |
| 1,952,664 | Esselen | Mar. 27, 1934 |
| 1,981,567 | Olsen | Nov. 20, 1934 |
| 2,045,350 | Griffin | June 23, 1936 |
| 2,085,463 | Fortune | June 29, 1937 |
| 2,140,981 | Booty et al. | Dec. 20, 1938 |
| 2,352,740 | Shannon | July 4, 1944 |

OTHER REFERENCES

Paper Trade Journal, October 15, 1925, pages 58 and 59.

Chemistry of Pulp and Paper Making by Sutermeister, 3rd ed., 1941, page 109, published by John Wiley and Sons, Inc., New York, N. Y.